United States Patent
Breiland et al.

(10) Patent No.: US 6,398,406 B1
(45) Date of Patent: Jun. 4, 2002

(54) TEMPERATURE DETERMINATION USING PYROMETRY

(75) Inventors: William G. Breiland, Albuquerque, NM (US); Alexander I. Gurary, Bridgewater; Vadim Boguslavskiy, Princeton, both of NJ (US)

(73) Assignee: Sandia Corporation, Albuquerque, NM (US)

(*) Notice: Subject to any disclaimer, the term of this patent is extended or adjusted under 35 U.S.C. 154(b) by 38 days.

(21) Appl. No.: 09/587,375

(22) Filed: Jun. 1, 2000

(51) Int. Cl.[7] .................................................. G01J 5/00
(52) U.S. Cl. ........................ 374/128; 374/126; 702/99; 356/43
(58) Field of Search ................................ 374/1, 9, 126, 374/128; 702/35, 36, 40, 85, 99, 108, 130, 132, 133, 134, 135, 136, 172, 183, 185; 356/43, 445, 446, 447, 448

(56) References Cited

U.S. PATENT DOCUMENTS

| | | | |
|---|---|---|---|
| 5,095,453 A | * 3/1992 | Pierson et al. ................ 702/99 |
| 5,180,226 A | 1/1993 | Moslehi ....................... 374/127 |
| 5,239,488 A | 8/1993 | Markham et al. ........... 364/557 |
| 5,326,172 A | 7/1994 | Ng .............................. 374/126 |
| 5,442,727 A | * 8/1995 | Fiory ......................... 374/126 |
| 5,443,315 A | * 8/1995 | Lee et al. .................... 374/126 |
| 5,564,830 A | 10/1996 | Bobel et al. ................ 374/126 |
| 5,568,978 A | 10/1996 | Johnson et al. ............. 374/161 |
| RE36,050 E | * 1/1999 | Thakur et al. ................ 356/43 |
| 6,056,434 A | * 5/2000 | Champetier ................. 374/126 |
| 6,179,466 B1 | * 1/2001 | Peuse et al. ................ 374/128 |
| 6,293,696 B1 | * 9/2001 | Guardado ....................... 374/1 |

OTHER PUBLICATIONS

Bobel, Moller, Wowchak, Hertl, Hove, Chow & Chow, Pyrometric Interferometry for Real Time Molecular Beam Epitaxy Process Monitoring, J. Vac. Sci. Technol. B 12(2). Mar./Apr. 1994, 1207–1210.

SVT Associates, Inc., Temperature and Film Thickness with the In–Situ 4000 Process Monitor advertisement (No Date).

* cited by examiner

*Primary Examiner*—Diego Gutierrez
*Assistant Examiner*—Madeline Gonzalez
(74) *Attorney, Agent, or Firm*—Elmer A. Klavetter

(57) ABSTRACT

A method for determining the temperature of a surface upon which a coating is grown using optical pyrometry by correcting Kirchhoff's law for errors in the emissivity or reflectance measurements associated with the growth of the coating and subsequent changes in the surface thermal emission and heat transfer characteristics. By a calibration process that can be carried out in situ in the chamber where the coating process occurs, an error calibration parameter can be determined that allows more precise determination of the temperature of the surface using optical pyrometry systems. The calibration process needs only to be carried out when the physical characteristics of the coating chamber change.

20 Claims, 9 Drawing Sheets

TEMPERATURE DETERMINATION USING PYROMETRY

This invention was made with Government support under Contract No. DE-AC04-94AL85000 awarded by the Department of Energy. The Government has certain rights in the invention.

BACKGROUND OF THE INVENTION

The invention describes a method for determining the temperature of a surface and more particularly, to a method for determining the temperature of a surface during a coating process by emissivity-correcting pyrometry.

Temperature measurement and control is important in coating processes that can occur in fields of manufacture such as coated optics, high-capacity optical components, integrated optical circuits and semiconductor and electronic components. In particular, temperature measurement and control is a critical factor in the growth of thin films by either chemical vapor deposition (CVD) or molecular beam epitaxy (MBE). It is particularly important in metal-organic CVD (MOCVD) thin film growth because compound semiconductors must often be grown with a very specific stoichiometry in order to maintain stringent lattice-matching conditions. The chemical reactions responsible for this CVD growth are often highly temperature dependent. Control of the deposition temperature thus becomes critical. Unfortunately, such control is difficult to achieve. The CVD environment employs reactive and toxic chemicals at high temperatures and requires the utmost in cleanliness to avoid unintentional doping or parasitic chemical reactions. Physical probes of the surface temperature cannot be used in such an environment.

Classical optical pyrometry, which measures the thermal emission from the hot surface is a strong candidate for a remote, in situ temperature probe. However, as thin films, such as those grown in semiconductor processes on wafer, are deposited, the emissivity of the surface can change dramatically. The emissivity change has two consequences. First, the heat loss from the surface, such as a wafer, due to thermal emission is changed by the presence of the thin film. This alters the balance in heat transfer and causes the surface temperature to change as the thin film growth is taking place. Second, a pyrometer that does not account for the emissivity changes will yield grossly inaccurate values for the surface temperature. It is not uncommon to encounter errors as large as 50° C. To avoid these errors, emissivity changes must be measured and appropriate corrections made to extract an accurate surface temperature.

One method to correct, at least to some extent, pyrometry measurements of temperature is reflectance-correcting pyrometry. The method is a specialized application of emissivity-correcting pyrometry. Thermal radiation from an idealized blackbody surface is described by the well-known Planck formula:

$$L_b(\lambda, T)d\lambda = \frac{c_{1L}}{\lambda^5(e^{c_2/\lambda T} - 1)} d\lambda$$

where $C_{1L}$ and $c_2$ are the first and second radiation constants, respectively. $L_b$ is the spectral radiance of the blackbody. For typical temperatures encountered in thin film growth (approximately 400° C. to 1200° C.), it is convenient to measure thermal radiation at a wavelength of 900 nm (generally with ±30 nm). Under these conditions, the Planck formula is virtually identical in value to the simpler Wien approximation:

$$L_b(\lambda, T)d\lambda \cong \frac{c_{1L}}{\lambda^5} e^{-c_2/\lambda T} d\lambda$$

A quantity proportional to thermal radiance can be measured by detecting the radiation from a spot of area A, gathering light over a solid angle of emission, $\Omega$, and a narrow range of wavelengths, $\Delta\lambda$. This thermal radiation signal, s, is described by:

$$s = fL_b A \Omega \Delta\lambda = C e^{-c_2/\lambda T}$$

where f and C are instrumental proportionality factors. An experimental value of s may be used to invert the above equation to extract the temperature from a blackbody, provided that the instrument is calibrated at least at one known temperature to effectively determine C. This is the fundamental basis for single-wavelength blackbody pyrometry.

The blackbody is, however, an idealization. No real surface actually emits thermal emission according to the above equations. The radiance of any real surface is described in terms of the emissivity, $\epsilon$:

$$L(\lambda,\theta,\phi,\sigma,T) = L_b(\lambda,T)\epsilon(\lambda,\theta,\phi,\sigma,T)$$

Emissivity is defined to be the fraction of thermal radiation emitted by a surface at wavelength $\lambda$, exit angle $\theta$, azimuthal angle $\phi$, polarization $\sigma$, and temperature, T, compared to a blackbody at the same temperature, T, and wavelength, $\alpha$. It can be, and generally is, a strong function of all its parameters, and is thus difficult to measure in practice. However, under conditions typically used in the manufacture of thin films, the emissivity is determined by measuring the specular reflectance. This is possible by using Kirchhoff's law, which gives an unconditional relationship between the emissivity of a surface and another materials property, the absorptivity, $\alpha$.

$$\alpha(\lambda,\theta,\phi,\sigma,T) = \epsilon(\lambda,\theta,\phi,\sigma,T)$$

The absorptivity is defined to be the fraction of electromagnetic energy absorbed by a material at temperature, T, when exposed to a beam of radiation with wavelength $\lambda$, incidence angle $\theta$, azimuthal angle $\phi$, and polarization a. For a blackbody, $\alpha=1$, independent of $\lambda$, $\theta$, $\phi$, $\sigma$, or T. For a real material, $\alpha<1$, and a can be a strong function of all the parameters above. To take advantage of Kirchhoff's law, the values of the wavelength, angle, and polarization must all be the same for the emissivity and absorptivity functions. This is important in the construction of an instrument that actually measures absorptivity as an indirect measurement of emissivity.

The final connection to specular reflectance is made using three assumptions specifically applicable to thin film semiconductor growth. The first assumption is that the semiconductor wafer is opaque. If a pyrometry wavelength is chosen too far below the bandgap of a substrate, this assumption may not be valid. However, it is generally possible to choose an above-bandgap wavelength for all but a few semiconductors. The second assumption is that the wafer remains smooth and flat during deposition. Under these conditions, an incident beam of light will scatter only in the specular direction and the reflected light beam is easily measured. If the surface becomes rough during deposition, then the formulas that follow are not valid. The third assumption is that the specular reflectance does not depend on azimuthal angle, $\phi$. This is generally true for compound semiconductors for which the reflectance anisotropy is typically less than one part in a thousand. This assumption is not strictly necessary to relate absorptivity to specular reflectance, but is convenient for practical applications on rotating wafers. If the above three assumptions apply, the following relationship between absorptivity and specular reflectance, R, is true:

$$\alpha(\lambda,\theta,\phi,\sigma,T)=1-R(\lambda,\theta,\sigma,T)$$

The following relationship can thus be derived:

$$L(\lambda, \theta, \sigma, T) = [1 - R(\lambda, \theta, \sigma, T)]\frac{c_{1L}}{\lambda^5}e^{-c_2/\lambda T}$$

This relationship is the emissivity-correcting pyrometry expression for a smooth, flat, opaque surface during thin film growth. It relates a thermal emission radiance, L, and a specular reflectance, R, to the surface temperature, T. This expression can be considered well-known (see e.g., Bobel, et. al. J. Vac Sci Technol. B 12 (1994) 1207). However, determination of the specular reflectance function $R(\lambda,\theta,\sigma,T)$ requires some method to take into consideration the variations that occur because of film growth and in the presence of stray background thermal emission.

DESCRIPTION OF SPECIFIC EMBODIMENTS

The accurate determination of temperature is critical in controlling many coating processes, particularly processes for the growth of thin films by chemical vapor deposition (CVD), metal-organic CVD (MOCVD), and molecular beam epitaxy (MBE). Because processing often precludes the use of physical probes in the reaction chamber, optical pyrometry has often been used to determine the temperature of the surface on which the coating growth occurs. Although the determination of temperature from a blackbody surface by optical pyrometry is well established, the determination in practice of temperature of a surface on which growth occurs can be significantly in error. Even accounting for the temperature variation from the ideal blackbody model, the presence of the coating on the surface causes both changes in the heat transfer and emissivity characteristics of the surface, resulting often in significant, pyrometric measurement errors as large as 50° C. Testing has shown that, for the processing of some semiconductor devices, temperature variations in the process of as low as 3° C. can render a device inoperable. A method for correction of the errors in standard pyrometric techniques for temperature determination is required for adequate process control.

The present invention provides a method for accurate temperature determination by emissivity-correcting pyrometry to account for the errors inherent in the process of producing a coating, such as a thin film, on a surface. The method requires pre-processing calibration steps to determine the apparatus-dependent and process-dependent errors that will occur during the growth processing. However, the pre-processing calibration is not required before every growth processing procedure but produces corrections that are valid until the apparatus-dependent errors change due primarily to physical changes in the apparatus itself. Additionally, in this method, the calibration is performed in the coating system itself and does not have to be calibrated off-line.

Figure 1:
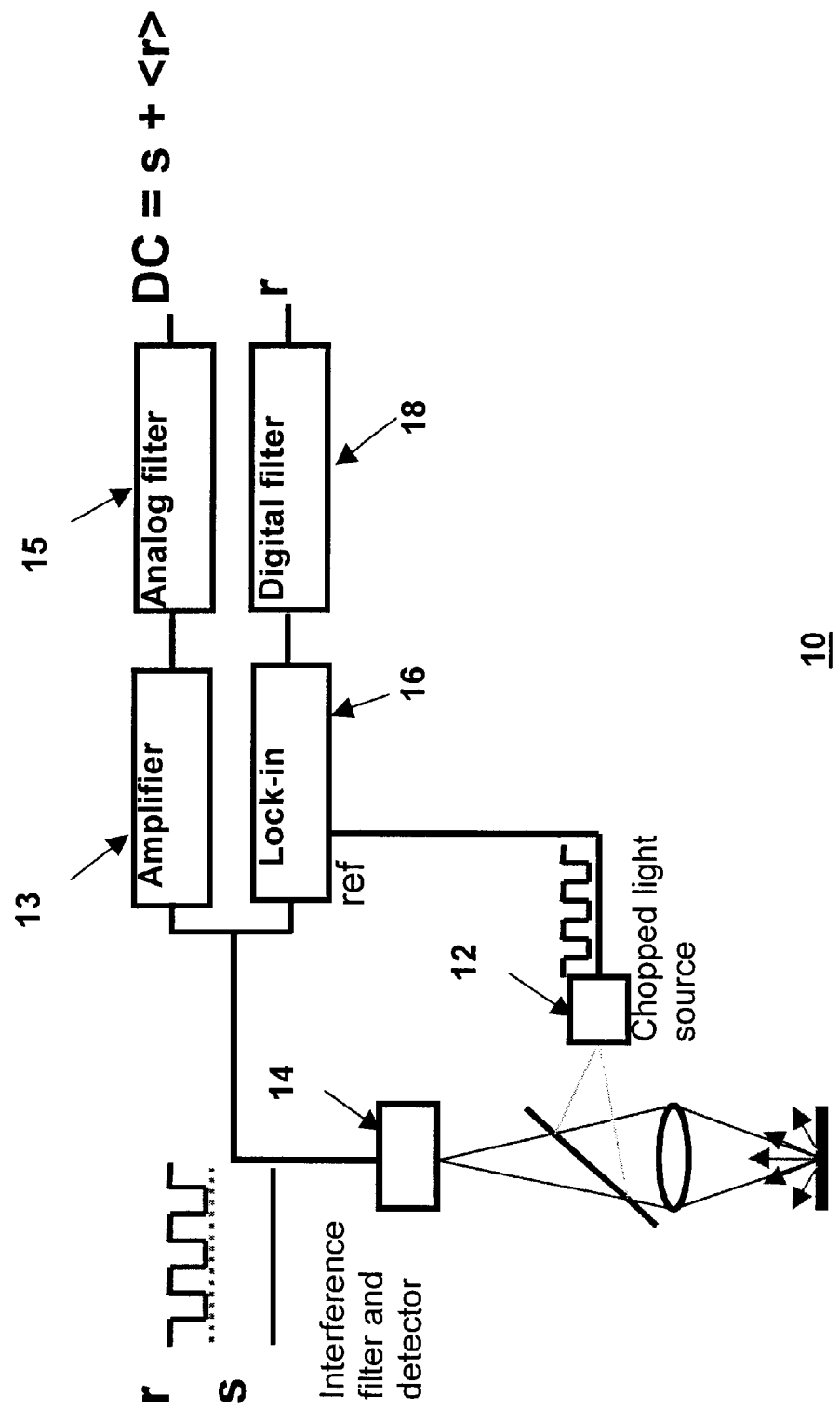
FIG. 1 shows schematically a pyrometry system for determining s and r.

In the method of the present invention, an optical pyrometry system, such a system being well known in the art, is used to determine a reflectance signal, r, and a thermal emission signal, s, from a surface. In general, a plurality of signals is determined as the coating process progresses, allowing the determination of the temperature of the surface as a function of time. Depending on the configuration of the optical pyrometry system utilized, these parameters can be measured directly or can be determined easily by measurement of related parameters. One example of such an optical pyrometry system is given in Bobel et al. (U.S. Pat. No. 5,564,830). Another optical pyrometry system is shown in FIG. 1.

In the method of the present invention, a calibration factor, $R_{fac}$, is determined to calibrate the system for absolute reflection and is calculated by determining the reflectance, $r_{rt}$, of the surface at a known temperature, such as at ambient or room temperature and using the known-in-the-literature specular reflectance of the calibration surface, such as a silicon wafer, $R_{rt}$, by:

$$R_{fac}=R_{rt}/r_{rt} \qquad (1)$$

The surface is heated to an elevated and known temperature to determine the absolute reflectance, $R_{cal}$, at the calibration temperature $T_{cal}$. The elevated temperature can be any temperature above room temperature but this calibration is generally performed at temperatures between approximately 400 and 600° C. for semiconductor applications. The reflectance, $r(T_{cal})$, is measured at $T_{cal}$, and the calibration factor $R_{fac}$, determined from Eq. 1, is used to determine $R_{cal}$ by $$R_{cal}=R_{fac}r(T_{cal}) \qquad (2)$$

The thermal emission, $s_{cal}$, is also measured or determined at this calibration temperature. All values of r and R are related by the calibration factor $R_{fac}$ ($R=R_{fac}r$).

According to Kirchhoff's law, the temperature can then be determined if certain assumptions apply. The Kirchhoff-derived formula for computing the temperature from a measured s and R (or r), $$\frac{1}{T} = \frac{1}{T_{cal}} - \frac{\lambda}{c_2}\ln\frac{s(1-R_{cal})}{s_{cal}(1-R)} \qquad (3)$$

The parameter λ, the beam wavelength, is set by the process operator. Its value is set depending on the conditions and requirements of the growth process. For semiconductor device growth of a thin film on a substrate, wavelengths ranging between approximately 600 and 1100 nm are frequently used, with growth temperatures of approximately 400° C. to 1200° C. A value of approximately 900 nm is convenient for the production of thin films of many semiconductor devices. For growth processes at low temperatures, a wavelength of a micron or more might be used. The value of $c_2$, the second radiation constant, is $1.439\times10^7$ nm·K (more significant figures can be obtained from standard handbooks, if the application warrants).

In particular, the assumptions for Eq. 3 include that the surface is opaque, smooth, and flat and that measurement or determination of s and r (or R) are made at the same values of beam wavelength λ, incidence angle θ, azimuthal angle φ, and polarization σ. By a smooth, flat surface, we mean that there is less than approximately 1% non-specular losses. For a blackbody surface, the absorptivity of the surface is identically unity, independent of these parameters. The apparatus configuration illustrated in FIG. 1 achieves the same values of λ, θ, φ, and σ by using identical optical paths for the collection of the s and r signals. The configuration purposely uses normal incidence to eliminate polarization errors and sensitivity to changes in incidence angles. However, there are still sources for systematic errors in the determination of s and r, which make temperature determination using Eq. 3 inaccurate.

The reflectance is calibrated, generally at the beginning of every deposition run, using Eq. 1. If the reflectance signal path is altered in any way during wafer heating and thin film growth, this calibration is no longer valid. Tilting of the wafer holder causing a partial obscuration of the reflected beam is one typical cause. Many other subtle causes for reflectance errors can be identified. In general, these errors may be summarized with the following expression:

$$R_{expt} = \alpha R + \beta \qquad (4)$$

$R_{expt}$ is the experimentally determined reflectance that is related to the actual reflectance R. This parameterizes scaling errors (α) and signal offset errors (β).

Systematic errors in the measurement of s can also occur. The thermal emission emanates from the surface in all directions and s is therefore not generally affected by small wafer tilts. Emission is observed through fixed apertures that do not shift with time. However, because thin film deposition is done in an enclosed chamber, thermal emission from any part of the substrate carrier is scattered throughout the chamber. Although the spatial filtering nature of the light collection system shown in FIG. 1 eliminates most of the background scattered light, it is impossible to eliminate all of it.

In the optical pyrometry system 10 shown in FIG. 1, a light source at a specified wavelength and frequency is chopped (12) and launched co-linearly with the thermal emission optical axis using a beamsplitter. A signal from the light chopping device 12 is sent to the lock-in amplifier 16 to provide the reference frequency. A single detector 14 with a bandpass interference filter and a silicon photodiode is used to process the thermal emission signal and the reflectance signal. To separate the signals, the reflectance light source is chopped and r (proportional to R by Eq. 1) is extracted using the lock-in amplifier 16 (referenced to the chopping frequency) and a digital filter 18. The DC component of the signal, processed through an amplifier 13 and analog filter 15, contains the thermal emission signal, s, and the DC average of the reflectance signal <r>.

Figure 2:
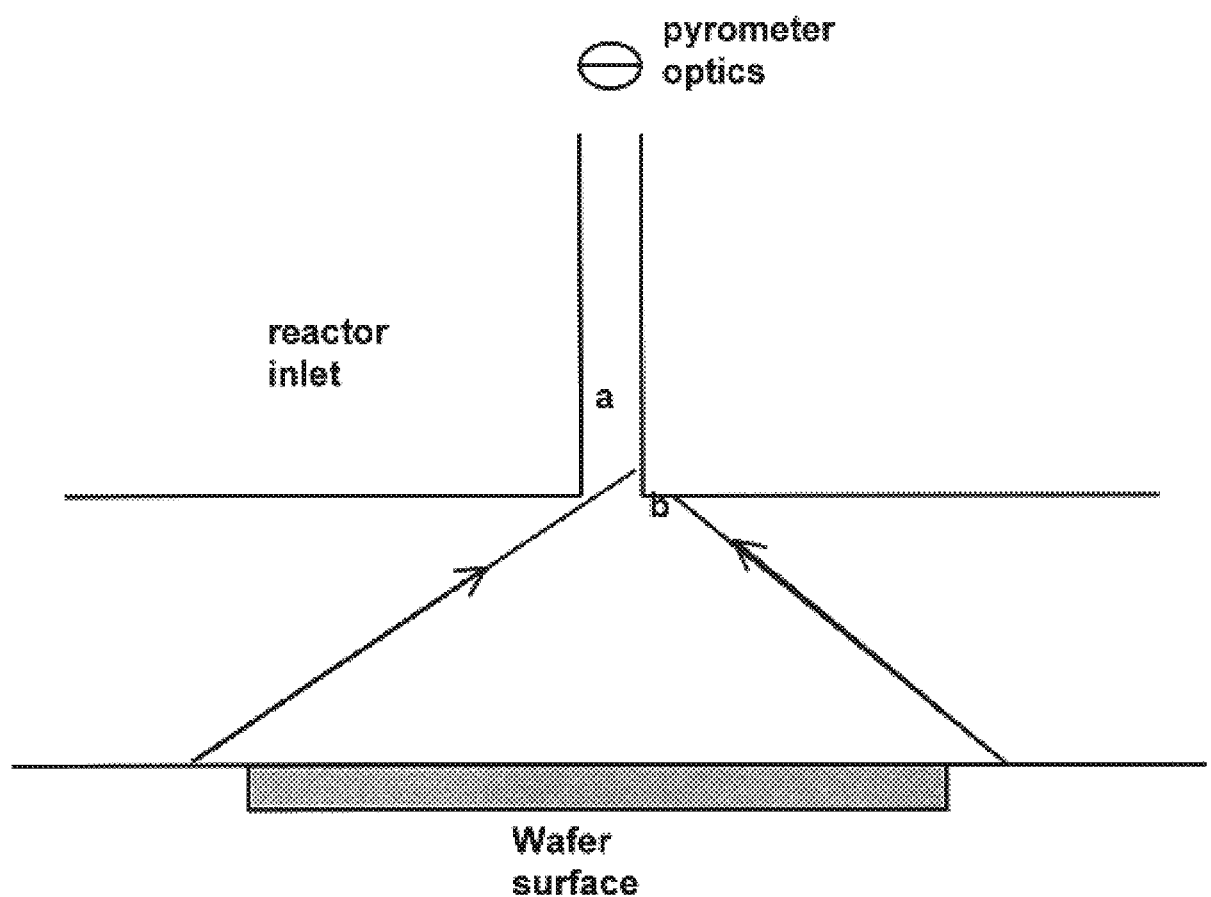
FIG. 2 shows two sources of scattered light from the wafer carrier.

FIG. 2 shows two sources of scattered light from the substrate carrier. Light from source a), where the light from the surface of the substrate carrier strikes the optical access tube and is scattered into the pyrometer optics, is thermal in nature, but doesn't have the (1–R) emissivity term from the substrate. Light from source b), where the light from the surface of the substrate carrier strikes the bottom of the gas inlet, scatters off the substrate surface, and into the pyrometer optics, also lacks the (1–R) term, but does contain an R factor due to the bounce off the substrate. The thermal radiation measurement is thus described as the desired signal plus two background signals:

$$s = C\delta(1-R)L_b + \tilde{\gamma}L_b + RL_b \qquad (5)$$

The error parameters, γ and ζ account for the emissivity of the wafer carrier and all geometric effects determining how much stray light reaches the detector. The error parameter, δ, describes a systematic scaling error in the thermal emission signal from the wafer.

In a perfectly executed experiment, the error parameters would have the following values:

$$\alpha = \delta = 1; \quad \beta = \tilde{\gamma} = \zeta 0 \qquad (6)$$

If the errors described above are systematic, i.e. constant during a deposition run, then it is possible to measure and correct for all of them by using a special growth calibration that exhibits large changes in reflectance, yet maintains a constant temperature during growth.

Given the need to eliminate artifacts and not actually measure each error factor introduced above, all of the error factors can be accounted for using just a single parameter. Using Eq. 4 and Eq. 5, then summing and factoring constants, yields Eq. 7, which provides the thermal emission as a function of a scaling constant, p, the temperature, the measurable values of R (or r, which is related to R by the calibration factor from Eq. 1) and the error term γ.

$$s = p(1-R+\gamma)e^{-c_2/\lambda T} \qquad (7)$$

Despite the inclusion of five error factors describing five different physical phenomena, the functional form of Eq. 7 allows only two mathematically unique numbers in the pre-exponential. One of these, p, will be eliminated during self-calibration. All details leading to pyrometer errors are thus lumped into only a single parameter (γ) that need not be dissected to extract the original error parameters. It can simply be used as a single parameter to account for all error factors and therefore simultaneously corrects for all systematic errors in the reflectance and stray thermal emission from the substrate carrier. The error correction parameter γ can be determined by a calibration process described subsequently.

Figure 3:
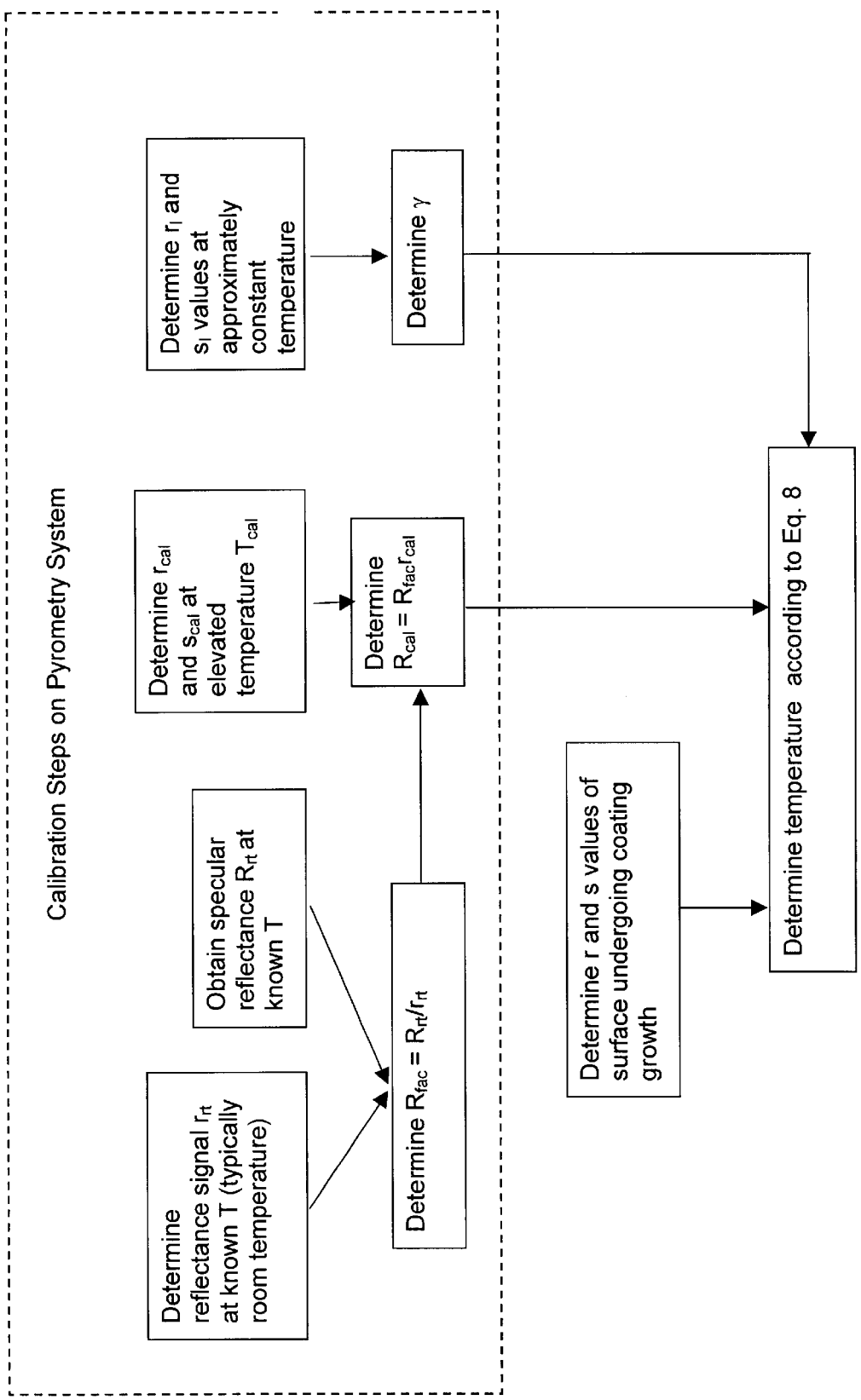
FIG. 3 shows a flow chart of one embodiment of the method of determining temperature of a surface according to the present invention.

Eq. 7 can then be used as the basis to determine the temperature T at any time in the deposition process by determining s and R from process measurements, where R can be determined by measuring r and multiplying by the calibration factor $R_{fac}$. FIG. 3 summarizes the general steps used in determining the temperature of a surface using optical pyrometry according to one embodiment of the method of the present invention.

$$\frac{1}{T} = \frac{1}{T_{cal}} - \frac{\lambda}{c_2} \ln \frac{s(1 - R^{cal} + \gamma)}{s_{cal}(1 - R + \gamma)} \quad (8)$$

Although the constant, 1+γ, could have been written as a single parameter, the form of Eq. 8 is used to demonstrate the similarity to Eq. 3 with γ collectively accounting for all the above errors; i.e. if γ is zero and there are no reflectance scaling and offset errors, then Eq. 3 is restored. Provided that the constant γ can be determined for the system, Eq. 8 is an accurate way to extract surface temperatures from surfaces such as semiconductor wafers during thin film growth in the presence of systematic errors in reflectance and stray thermal emission. For the purposes of this discussion, the method of the present invention used to determine the error correction parameter γ is considered equivalent to determining an error correction parameter equal to 1+γ.

Determination of the Error Parameter γ

The error parameter γ is a function of the pyrometry system geometry and apparatus conditions, such as surface finish, reactor geometry, and growth surface orientation within the reactor, but is independent of temperature. The determination of γ requires that a calibration growth deposition process be performed where large variations in reflectance occur while small variations in temperature are maintained. In one embodiment, a suitable deposition process to determine γ is with a Distributed Bragg Reflector (DBR) mirror structure at the pyrometer wavelength. A DBR is an ideal candidate to test a reflectance-correcting pyrometer system. Alternating layers of low-index and high-index material cause large excursions in the reflectance during growth, allowing testing to determine whether the emissivity correction is working properly over the full range of reflectance values. The temperature of the structure is expected to remain relatively constant after an initial transient. In general, having a more constant temperature allows a better determination of the error correction parameter given the same number of values of r and s obtained. This is caused by the fact that the mirror creates a sharp spike in reflectance in only one part of the spectrum. Emissivity values at long wavelengths, where thermal emission is largest, are largely unchanged. This presents a relatively constant radiative heat loss environment once several stacks of the DBR structure have been grown.

The best DBR structure is one that achieves high reflectance values at the pyrometer wavelength. For example, a AlGaAs DBR structure designed for maximum reflectance at 860 nm at room temperature yielded a high 900 nm reflectance when grown at 700° C. High reflectance values yield low thermal emission signals from the wafer, exposing contributions from stray light and reflectance errors. This allows determination of an accurate value of γ.

Given that the temperature during DBR growth does not change appreciably after an initial transient period, Eq. 7 yields:

$$s = K(1+\gamma-R) = A - BR\gamma = A/B - 1 \quad (9)$$

After determining a plurality of experimental values for s and r (or R), a suitable value of γ can be determined. In Eq. 9, there are two unknown constants (K and γ); therefore at least two pairs of s and r values are required to uniquely determine γ. The determination of γ can be done by a variety of standard techniques, including regression techniques such as the minimum variance method and a linear regression method. If the temperature can be held reliably constant during the measurement of s and r, a fit of s versus R to a straight line will yield the parameter γ. If the temperature drifts, as can typically happen, during the measurement of s and r, the minimum variance method provides a more robust method to determine γ. The minimum variance method is a direct approach that minimizes the amplitude of the temperature artifacts by adjusting γ. The variance, V, of the function represented by Eq. 9 is minimized and, setting the derivative to zero, yields a value for the parameter $\gamma_{opt}$ (also referred to as simply γ), the optimized error correction factor:

$$\gamma_{opt} = \frac{-\sum_i^N \left(\frac{1-R_i}{s_i} - \tilde{R}\right)\left(\frac{1}{s_i} - \hat{s}\right)}{\sum_i^N \left(\frac{1}{s_i} - \hat{s}\right)^2} \quad (10)$$

$$\tilde{R} = \frac{1}{N}\sum_i^N \frac{1-R_i}{s_i}$$

$$\hat{s} = \frac{1}{N}\sum_i^N \frac{1}{s_i}$$

The sums run over the number of data points, N. The desire is to minimize the uncertainty or variance in the merit function, m=(1−R+γ)/s. This directly minimizes artifacts in the temperature waveform extracted from Eq. 8. The value of $\gamma_{opt}$ is the uncertainty-minimized, optimum value of γ that can be used in Eq. 8 for calculating the temperature of the process.

An estimate can be made of the uncertainty in $\gamma_{opt}$. This is particularly valuable if a DBR structure is not available for γ determination and the range in reflectance values may be insufficient to extract a meaningful $\gamma_{opt}$. If the temperature is truly constant over the range of data used, then a noise-free function would yield exactly the same value for all $R_i$ and $s_i$, at the optimized value of $\gamma = \gamma_{opt}$. Solving the merit function expression for $\gamma_i$ at each $R_i$ and $s_i$ pair gives a distribution of $\gamma_i$'s whose standard deviation, σ, is a measure of the trustworthiness of $\gamma_{opt}$ as a meaningful value:

$$\gamma_i = S_i \bar{m}(\gamma_{opt}) - 1 + R_i$$

$$\langle \gamma_i \rangle \cong \gamma_{opt} \quad (11)$$

$$\tau(\gamma_i) << \gamma_{opt}$$

The last equation states that if the standard deviation for the $\gamma_i$'s is not significantly smaller than $\gamma_{opt}$, then the data does not have enough reflectance range to provide a meaningful γ factor.

In an alternative method to accounting for the errors represented by the parameter γ, an emissivity-correcting pyrometer is first calibrated with a blackbody source outside of a reactor. The thermal emission signal is simply $$s = Ce^{-c_2/\lambda T} \quad (12)$$

Measurement of the thermal emission signal from a blackbody furnace at a known temperature can be used to determine the value of the calibration constant, C. Temperature measurement in a real system consists of measuring s and R and determining the emissivity from the relationship, $\epsilon_m = 1-R$. The measured temperature, $T_m$, in a system that assumes no reflectance errors or background thermal radiation is then extracted with the formula:

$$\frac{1}{T_m} = \frac{\lambda}{c_2} \ln \frac{C\varepsilon_m}{s} \quad (13)$$

Figure 4:
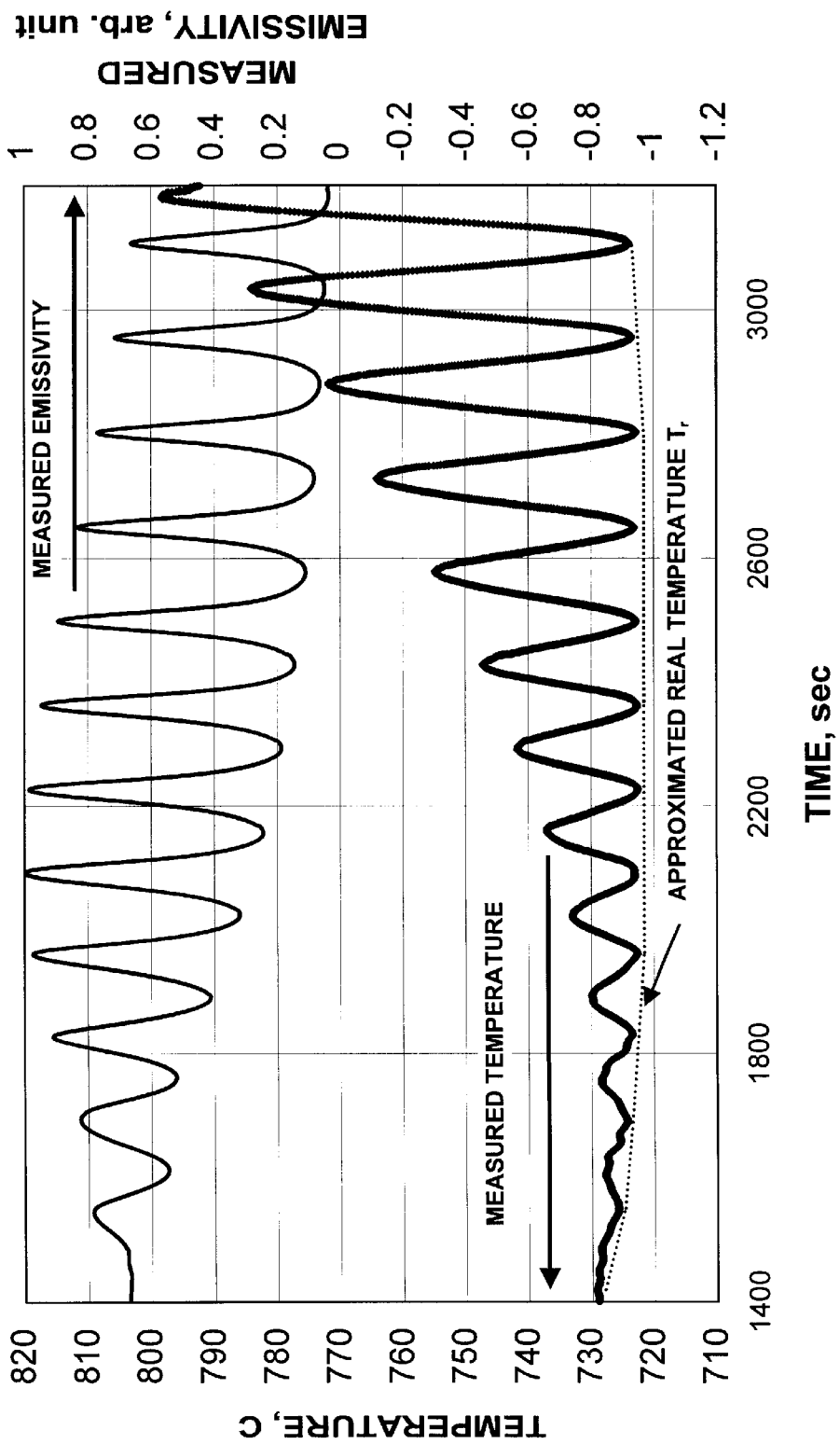
FIG. 4 shows an example of temperature overcompensation.

In a system with stray thermal radiation or reflectance errors, the measured temperature, $T_m$, will exhibit temperature overcompensation effects, as shown in FIG. 4. To account for these offsets, an effective emissivity can be constructed to cancel the extra signal that is present in s with the errors represented by $\gamma$ incorporated into the effective emissivity term. The "real" temperature, $T_r$, is assumed to be the locus of $T_m$ temperatures at the highest emissivity values, as shown in FIG. 4.

The value for the effective emissivity is determined by constraining the thermal emission signal to have a fixed temperature:

$$s(T_r) = s(T_m) \quad (14)$$

$$\varepsilon_{eff} e^{-c_2/\lambda T_r} = \varepsilon_m e^{-c_2/\lambda T_m}$$

$$\varepsilon_{eff} = \varepsilon_m \exp\left(\frac{c_2}{\lambda}\left(\frac{1}{T_r} - \frac{1}{T_m}\right)\right)$$

In Eq. 14, $T_r$ is known, as is the wavelength $\lambda$ and radiation constant $c_2$. From the measured values of temperature $T_m$ and emissivity $(1-R)\varepsilon_m$ (such as the data from FIG. 4), the effective emissivity, $\varepsilon_{eff}$ can be determined. By fitting $\varepsilon_{eff}(\varepsilon_m)$ to a straight line, any future $\varepsilon_{eff}$ can be calculated from a measured $\varepsilon_m$ without assuming a real temperature:

$$\varepsilon_{eff} = e_0 + e_1 \varepsilon_m \quad (15)$$

Figure 5:
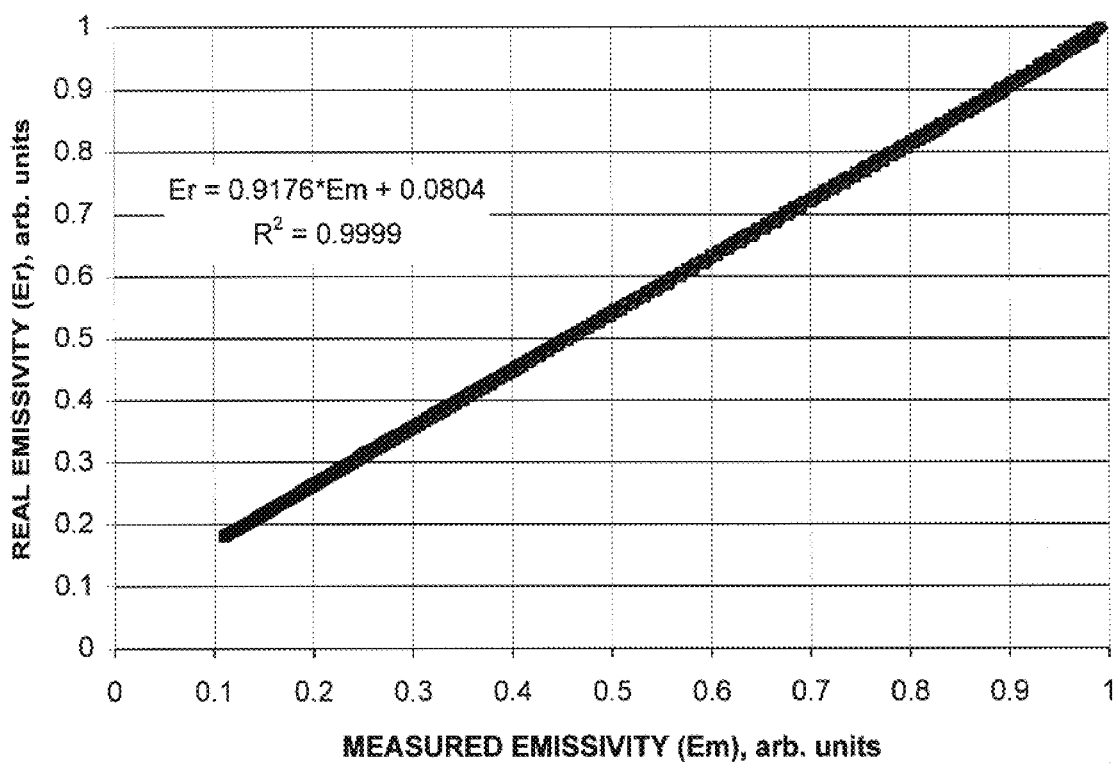
FIG. 5 shows the determination of the relationship defining the effective emissivity term in one embodiment.

FIG. 5 shows one determination of the relationship defining $\varepsilon_{eff}$ from measured T and $\varepsilon_m$ data.

To determine temperatures free of artifacts, therefore, s and $\varepsilon_m = 1-R$, are measured, $\varepsilon_{eff}$ is calculated from Eq. 15, and then T is computed according to:

$$\frac{1}{T} = \frac{\lambda}{c_2} \ln \frac{p(e_0 + e_1 \varepsilon_m)}{s} \quad (16)$$

Figure 6:
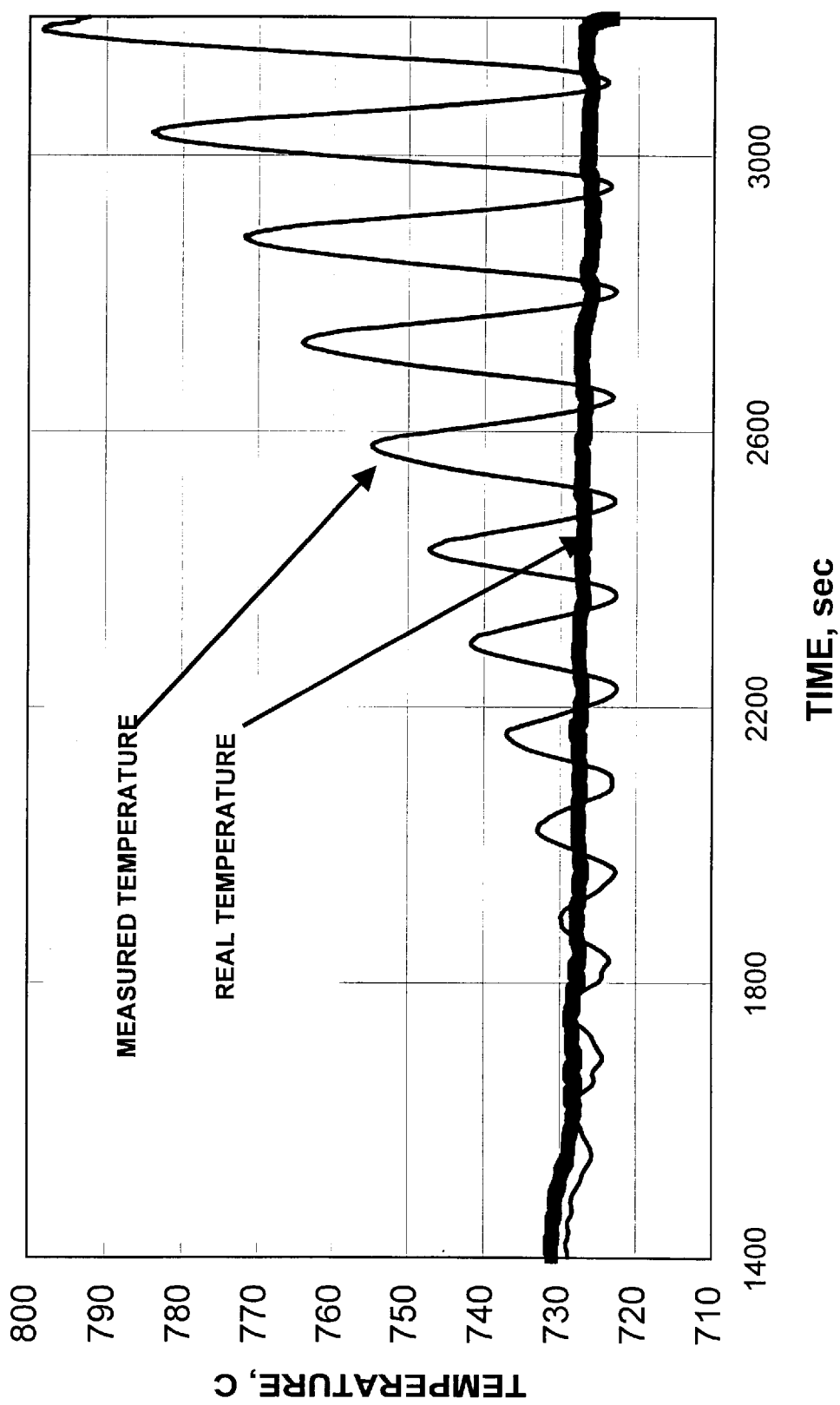
FIG. 6 shows correction of temperature using the effective emissivity relationship according to one embodiment of the present invention.

The errors associated with the error term $\gamma$ in Eq. 8 are here embedded in the effective emissivity relationship given by Eq. 15. Specifically, Eq. 16 and Eq. 7 are seen to be identical using the relationships $p=C/e_1$ and $\gamma=e_0/e_1$. The blackbody-calibrated constant C may be used directly in Eq. 16, or the constant p may be determined with in situ calibration. FIG. 6 shows an example of how the temperature was corrected during the measurement of temperature from a surface upon which a thin film was growing.

In one embodiment, the pyrometry system illustrated in FIG. 1 was used to obtain measurements of s and r. FIG. 1 shows a schematic of a pyrometer that simultaneously measures thermal emission and specular reflectance at normal incidence. Normal incidence was chosen to eliminate errors due to polarization effects and sensitivity to incidence angle. It also allowed the use of a single window for optical access. In the system illustrated in FIG. 1, the thermal emission signal, s, was measured at normal incidence through a 10-nm bandpass interference filter and a silicon photodiode with an amplifier and low-pass analog filter. Reflectance was measured by chopping a light source beam, launching the beam co-linearly with the thermal emission optical axis using a beamsplitter and detecting the reflected signal, r, with a lock-in amplifier. In this embodiment, the temperature was determined during the growth of a GaAs/AlGaAs structure, correcting for errors resulting because the surface was not an ideal blackbody and also accounting for the errors resulting from the growth of the thin film structure.

A single detector was used to record the thermal emission signal and the reflectance signal. To separate the signals, the reflectance light source was chopped and r R was extracted using a lock-in amplifier referenced to the chopping frequency. The DC signal contained the sum of the thermal emission signal and the average of the reflectance signal, but the two were separated with calibration and software.

A 10-nm bandpass interference filter was used at 900 nm to keep the wavelength nearly monochromatic, avoiding uncorrectable errors due to spectral features during thin film growth. The collection optics are limited by a 15-mm diameter window in the present embodiment at roughly 200 mm from the surface, limiting the range of incidence angles to a maximum of two degrees. Measuring the light at normal incidence with a small angular spread eliminated polarization effects and angle-dependent reflectance and emissivity corrections.

The apparatus shown in FIG. 1 simultaneously measures thermal emission and reflectance using a beamsplitter. This provides identical optical paths for reflected and thermal light, essential for taking advantage of Kirchhoff's law relating emissivity and absorptivity. This has the added bonus of requiring only one optical access window and provides a means to measure reflectance at exactly 0° incidence. By simultaneously measuring thermal emission and reflectance using the same detector and same interference filter for selecting a single wavelength, errors were reduced that would occur in the ratio s/(1−R) if two different detectors were used. By using a narrow bandpass interference filter (10 nm), artifacts that are not part of single-wavelength pyrometry can be eliminated. Many commercial pyrometers use wider bandwidths (approximately 70 nm) requiring spectral adjustments to the temperature extraction algorithms.

The configuration of FIG. 1 uses an optical arrangement that takes advantage of spatial filtering to reject stray light and to provide a system that is insensitive to wafer tilt. This is critical for avoiding gross artifacts that appear in the temperature waveforms during thin film growth. To achieve this capability, the end of the receiving optical fiber was imaged on the wafer, and the end of the reflectance source optical fiber was imaged either midway between the wafer and the beamsplitter or directly on the receiving lens.

The instrument illustrated in FIG. 1 can be calibrated on the deposition system to which the method of the present invention is to be applied and does not need any offline calibration procedure. This automatically corrects for coated windows and geometrical effects of the light collection that cannot be accounted for in any other way. In situ calibration also plays an integral role in correcting for stray thermal radiation effects, which are intimately connected to the specific state of the particular growth chamber in which the pyrometer is making measurements.

Signal separation and calibration of the pyrometer illustrated in FIG. 1 was accomplished with the following procedures. Under operating conditions, a lock-in signal, r, was recorded. This signal is proportional to the absolute reflectance, R. A DC signal that is the sum of the thermal emission signal and a proportional fraction of the reflectance signal was also recorded:

$$DC = s + ar$$

The factor, a, was determined by measuring signals DC and r at some known temperature, such as room temperature, where the value of s was known to be negligibly small. The signals can also be measured at some other known temperature either above or below room temperature. For this embodiment, room temperature was used for convenience. Then a was calculated from $$a = DC(\text{room temperature})/r(\text{room temperature})$$

The a factor is an instrument-specific value that need only be determined once for a given set of gains of the lock-in and low-pass amplifier. The value for s was then determined during the deposition process, or run, from $$s = DC - ar$$

The reflectance signal at the known temperature, in this case room temperature, was also used to calibrate the system for absolute reflectance by using the known-in-the-art room-temperature reflectance of the calibration wafer (these values are available from standard handbook publications or can be measured directly using commercial reflectance instruments):

$$R = R_{fac} r$$

$$R_{fac} = R(\text{room temperature})/r(\text{room temperature})$$

The wafer was then heated to a known temperature that was hot enough to yield a good signal-to-noise thermal emission signal, $s_{cal}$ yet cool enough to use the deposition system's thermocouple control temperature as a calibration point, $T_{cal}$, typically around 550° C. Alternatively, the known temperature of the wafer can be determined with a melting point standard, such as an aluminum film on a silicon substrate. The lock-in signal at the calibration temperature gave a value for $R_{cal} = R_{fac} r(T_{cal})$; $s_{cal}$, was also determined.

Although Eq. 3 could have been used to calculate temperatures during the film growth process, and can in fact correct the temperature determination to some extent relative to uncorrected determinations, errors still would be present in the temperature determination due to changes in emissivity from the thin film interference during the growth process. The fact that errors in temperature as calculated from Eq. 3 would still be present resulted from repeated pyrometer tests using multiple pyrometer systems where consistent discrepancies were present, indicating that errors were still present that were not accounted for in the analysis.

Figure 7:
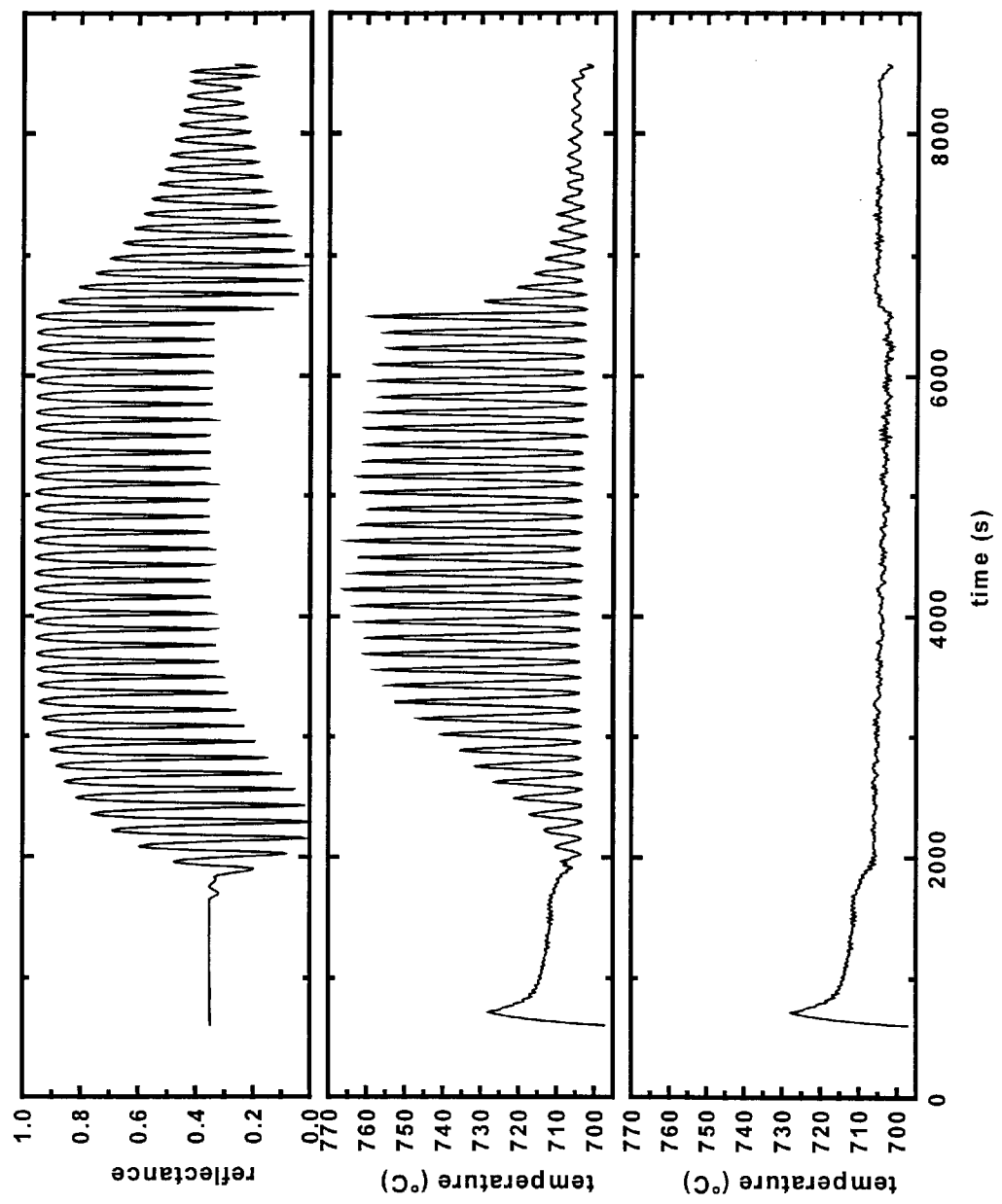
FIG. 7 shows temperature determination by applying the γ correction to a DBR.

Therefore, the method of the present invention was applied to correct linear errors in R and s that resulted from a wide variety of mechanical and optical effects, as well as stray radiation from the sources other than the smooth, flat, opaque substrate surface. A DBR mirror structure was used as previously described to determine the error term γ using measurements from the pyrometry system for s and r. FIG. 7 shows the results of applying the γ correction to a DBR that was part of an optically-pumped vertical cavity surface emitting laser structure. The top trace is the reflectance waveform recorded at 900 nm. The middle trace is the temperature extracted using Eq. 3. Note that the artifacts are greatly exaggerated at high reflectance values. The bottom trace is the temperature using Eq. 8 with γ=0.081. Obvious artifacts are gone, and small real temperature shifts that occur during growth may be detected. Once γ has been determined, it can be used in subsequent growth runs. Provided that the environment leading to stray thermal radiation and reflectance errors does not change, it will consistently suppress temperature overcompensation artifacts.

Figure 8:
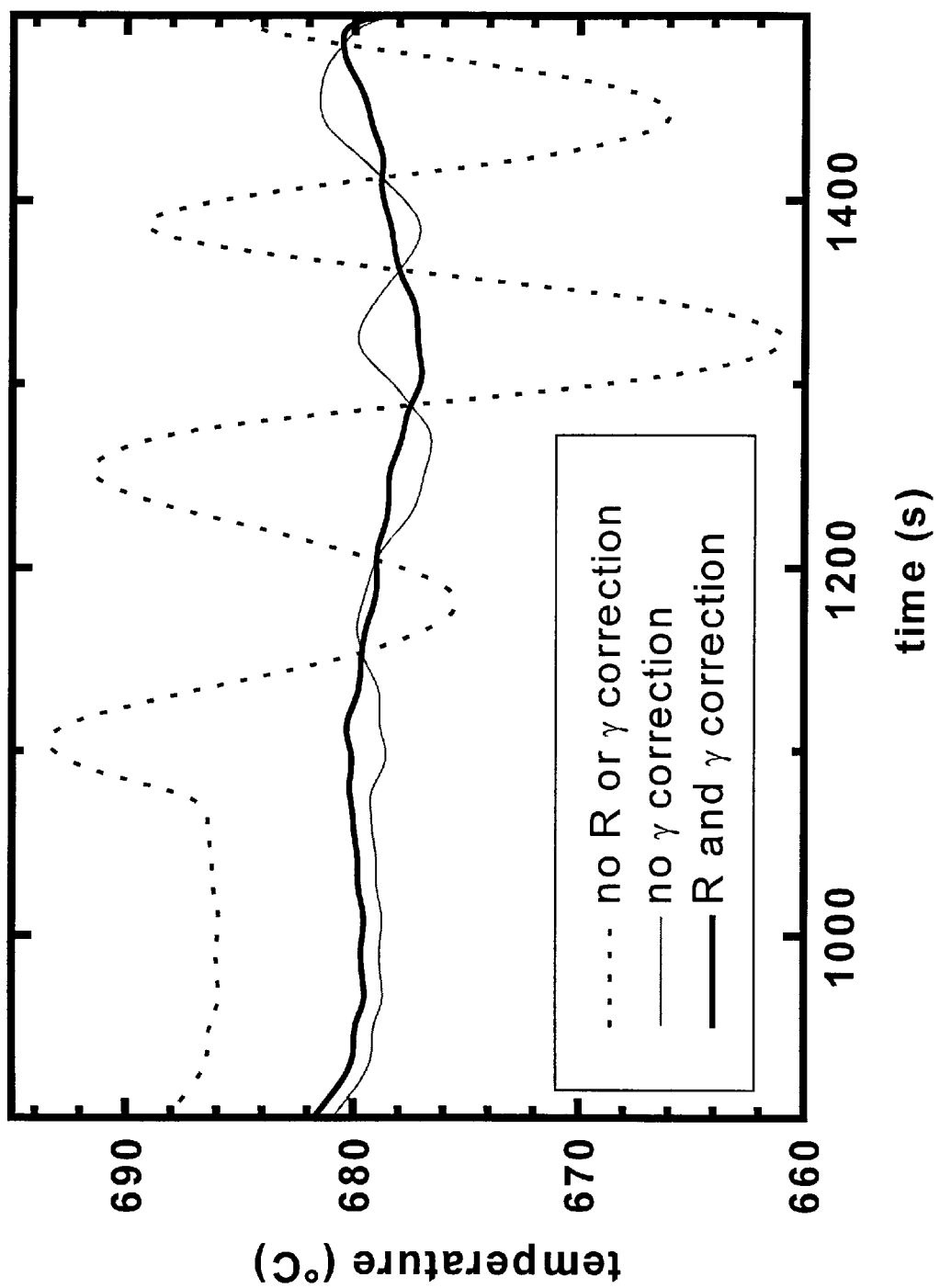
FIG. 8 shows determination of temperature using Eq. 8 during the growth of 200 nm of AlAs, followed by 220 nm of GaAs.

In another example, FIG. 8 shows determination of temperature using Eq. 8 and applying the error corrector parameter γ=0.081 previously determined. In the example, 200 nm of AlAs was grown, followed by growing 220 nm of GaAs. The figure shows temperature determination assuming 1) no correction, such as by using the Wien approximation, 2) only R corrections using Eq. 3, and 3) accounting for errors using the method of the present invention (Eq. 8). Note that the addition of the γ factor correction removes obvious temperature overcompensation artifacts. Temperature changes that remain after reflectance and gamma correction are consistent with higher emissivity AlAs causing a drop in surface temperature and the temperature being restored as GaAs is deposited.

Figure 9:
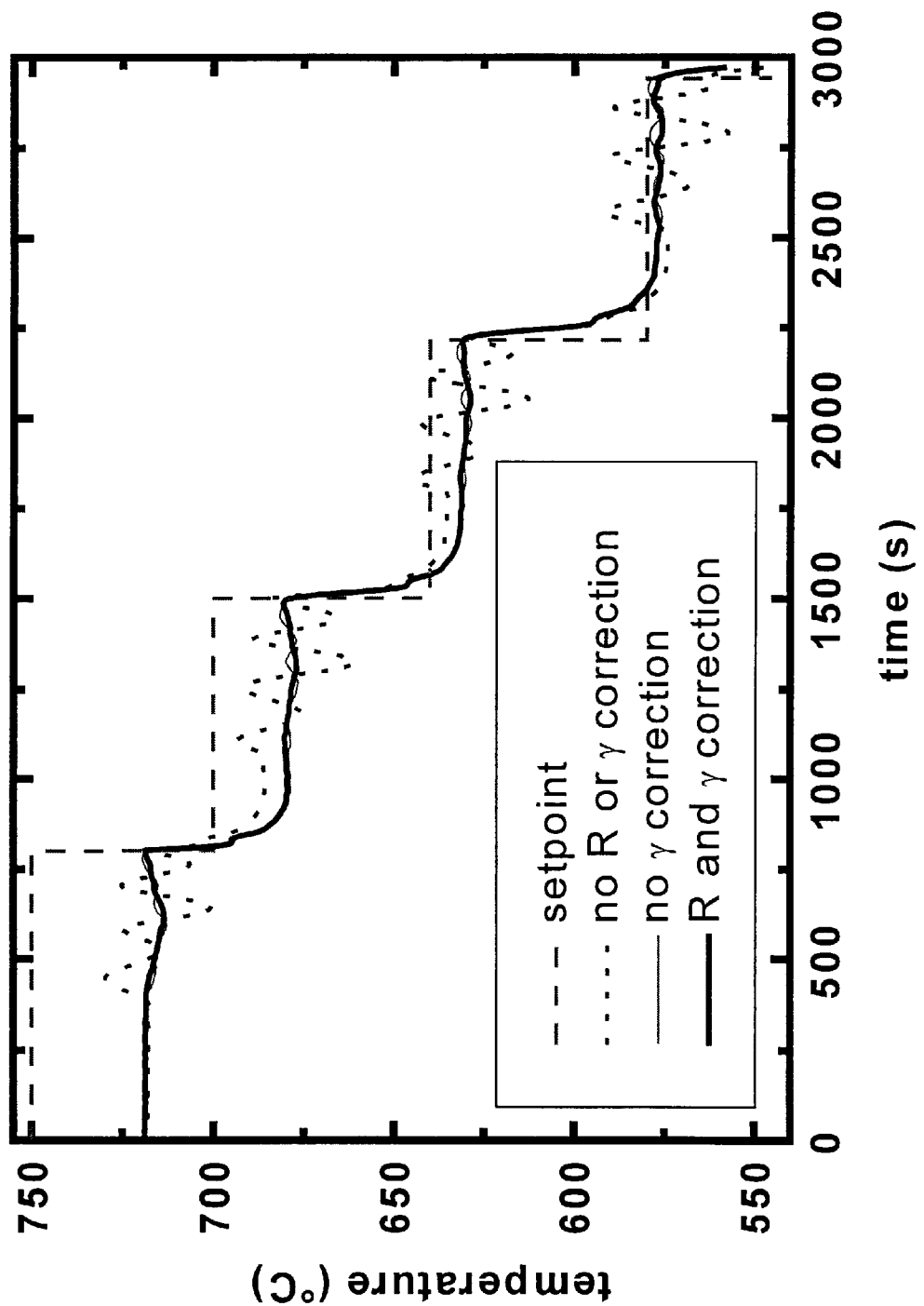
FIG. 9 shows determination of temperature using Eq. 8 during growth at four different setpoints.

In another example, FIG. 9 shows determination of temperature on a full growth run of the same two-layer test. The two-layer AlAs and GaAs structure was grown at 750° C., 700° C., 640° C. and 580° C. thermocouple setpoint temperatures. Note that the surface temperature deviates systematically from the setpoint value as radiative losses increase with higher growth temperatures. All artifacts from temperature overcompensation are essentially removed by application of the gamma correction, except at the lowest setpoint temperature.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The following publications are incorporated by reference herein:

U.S. Pat. No. 5,564,830, issued on Oct. 15, 1996.
U.S. Pat. No. 5,326,172, issued on Jul. 5, 1994.
U.S. Pat. No. 5,568,978, issued on Oct. 29, 1996.

We claim:

1. A method to determine an error correction parameter γ for temperature determination using pyrometry, comprising:
determining a plurality of thermal emission signal $s_i$ values and specular reflectance $R_i$ values from a first surface for which a temperature is to be determined, said specular reflectance values proportional to reflectance signal $r_i$ values by a calibration factor $R_{fac}$ according to $R_i = R_{fac} r_i$, where $R_{fac}$ is determined according to Eq. 1, $R_{fac} = R_{rt}/r_{rt}$, where $R_{rt}$ is the specular reflectance of a calibration surface at a specified temperature and $r_{rt}$ is the reflectance signal value of said first surface at said specified temperature; and
determining the error correction parameter γ, according to the equation $$s_i = K(1 + \gamma - R_i)$$

in which K is a constant.

2. The method of claim 1 further comprising the step of first determining at a known temperature a reflectance signal value rt from a second surface and determining said calibration factor $R_{fac}$, said $R_{fac} = R_{rt}/r_{rt}$, wherein $R_{rt}$ is the specular reflectance value of said second surface.

3. The method of claim 2 further comprising the step of determining at a known elevated temperature, $T_{cal}$, a thermal emission signal value $s_{cal}$ and a specular reflectance value $R_{cal}$.

4. The method of claim 3 wherein said known elevated temperature $T_{cal}$ is between approximately 400° C. and approximately 600° C.

5. The method of claim 2 wherein said known temperature is room temperature.

6. The method of claim 1 wherein the first surface is a Distributed Bragg Reflector.

7. The method of claim 6 wherein the Distributed Bragg Reflector is an AlGaAs Distributed Bragg Reflector.

8. The method of claim 6 wherein the first surface is held at approximately constant temperature.

9. The method of claim 1 wherein determining said error correction parameter $\gamma$ is performed by regressing said plurality of thermal emission signal values and specular reflectance values.

10. The method of claim 9 wherein said regressing is selected from a linear regression method and a minimum variance method.

11. The method of claim 10 wherein the variance associated with the error correction parameter $\gamma$ is less any single value of the error correction parameter $\gamma$.

12. The method of claim 1 wherein the plurality of thermal emission signal values and reflectance values are determined by a pyrometry system wherein the thermal emission signal values and reflectance values are simultaneously measured with the same detector, at normal incidence, with an angular spread of less than approximately two degrees, and a wavelength bandwidth of less than approximately 10 nm.

13. A method of determining temperature of a surface upon which a coating is grown using an optical pyrometry system, said optical pyrometry system providing multiple output reflectance signal $r_i$ values and output signal $DC_i$ values, each said output signal value $DC_i=s_i+ar_i$, wherein $s_i$ is a thermal emission signal and a is a constant of the optical pyrometry system, comprising:

measuring at a temperature where $s_i$ is negligibly small a value of $r_i$ and $DC_i$ from a surface;

determining a, wherein $a=DC_i/r_i$;

determining $R_{fac}$, wherein $R_{fac}=R_i/r_i$, wherein $R_i$ is the specular reflectance of a calibration surface at said temperature;

determining at a known elevated temperature, $T_{cal}$, at least two thermal emission signal $s_i$ values and at least two specular reflectance $R_i$ values, wherein each thermal emission signal value is equal to the output signal value $DC_i$ minus $ar_i$ and wherein the specular reflectance value is equal to $R_{fac}$ multiplied by the output reflectance signal value;

calculating the error correction parameter $\gamma$ according to $s_i=K(1+\gamma-R_i)$, wherein at least two values of $s_i$ and $R_i$ are used to determine the constant K and the error correction parameter $\gamma$; and determining the temperature of a surface upon which a coating is grown according to $$T = \left[\frac{1}{T_{cal}} - \frac{\lambda}{c_2}\ln\frac{s(1-R_{cal}+\gamma)}{s_{cal}(1-R+\gamma)}\right]^{-1}$$

in which:

T represents the temperature of the surface upon which a coating is grown, $\lambda$ represents the wavelength of incident radiation from a light source on the surface upon which a coating is grown, $c_2$ represents the second radiation constant, $1.439\times10^7$ nm·K, R represents the specular reflectance value from the surface, wherein R is equal to $R_{fac}$ multiplied by the output reflectance signal value r, s represents the thermal emission signal value from the surface, and cal as a subscript represents a value taken at the calibration temperature.

14. The method of claim 13 wherein $\lambda$ is between approximately 300 nanometers and 1 micron.

15. The method of claim 13 wherein $\lambda$ is greater than 1 micron.

16. The method of claim 13 wherein $\lambda$ is approximately 900 nanometers.

17. The method of claim 13 wherein said surface upon which a coating is grown is selected from a silicon surface and a compound semiconductor surface.

18. A method of determining the temperature of a surface on which a coating is grown, comprising:

measuring a thermal emission signal s from a blackbody furnace at a known temperature T and wavelength $\lambda$;

calculating a calibration constant C, wherein $C=s/(\exp(-c_2/\lambda T))$, wherein $c_2$ is the second radiation constant;

measuring using an optical pyrometry system a plurality of thermal emission signal values $\gamma_m$ and emission signal values $\epsilon_m$, wherein $\epsilon_m=1-R_m$, wherein $R_m$ are the specular reflectance values;

determining the measured temperature values $T_m$, according to the formula $$T_m=[\lambda/c_2 \ln(C\epsilon_m/s)]^{-1}$$

determining a temperature $T_r$ at the locus of $T_m$ values at the highest emissivity signal values $\epsilon_m$;

determining error correction parameters $e_0$ and $e_1$, according to the equation $$e_0+e_1\epsilon_m=\epsilon_m \exp(c_2/\lambda(1/T_r-1/T_m)); \text{ and}$$

determining the temperature of a surface according to the equation $$T = \left[\frac{1}{T_{cal}} - \frac{\lambda}{c_2}\ln\frac{s(e_0+e_1\varepsilon_{m,cal})}{s_{cal}(e_0+e_1\varepsilon_m)}\right]^{-1}$$

in which $T_{cal}$ is a calibration temperature of a calibration surface, $\epsilon_m$, cal is the emissivity of the calibration surface at the calibration temperature, $s_{cal}$ is the thermal emission signal value at the calibration temperature.

19. The method of claim 18 wherein the calibration temperature is room temperature.

20. The method of claim 18 wherein the surface on which a coating is grown is selected from a silicon surface and a compound semiconductor surface.

* * * * *